United States Patent [19]

Sircar et al.

[11] 4,264,340

[45] Apr. 28, 1981

[54] VACUUM SWING ADSORPTION FOR AIR FRACTIONATION

[75] Inventors: Shivaji Sircar; Thomas R. White, both of Allentown, Pa.

[73] Assignee: Air Products and Chemicals, Inc., Allentown, Pa.

[21] Appl. No.: 16,460

[22] Filed: Feb. 28, 1979

[51] Int. Cl.³ .................... B01D 51/00; B01D 53/00
[52] U.S. Cl. ........................................ 55/25; 55/31; 55/33; 55/58; 55/68; 55/75
[58] Field of Search ............... 55/25, 33, 58, 68, 75, 55/62, 30, 31, 180, 179, 189

[56] References Cited

U.S. PATENT DOCUMENTS

| | | | |
|---|---|---|---|
| 3,085,379 | 4/1963 | Kiyonaga et al. | 55/23 |
| 3,140,931 | 7/1964 | McRobbie | 55/58 |
| 3,533,221 | 10/1970 | Tamura | 55/33 |
| 3,720,042 | 3/1973 | Simonet | 55/25 |
| 3,796,022 | 3/1974 | Simonet et al. | 55/25 |
| 3,891,411 | 6/1975 | Meyer | 55/68 |
| 3,923,477 | 12/1975 | Armond et al. | 55/25 |
| 4,013,429 | 3/1977 | Sircar et al. | 55/58 |

Primary Examiner—Charles N. Hart
Assistant Examiner—E. Rollins Cross
Attorney, Agent, or Firm—E. Eugene Innis; Thomas G. Ryder

[57] ABSTRACT

The water content of high purity nitrogen obtained by vacuum swing adsorptive fractionation of ambient air, is removed in a companion thermal swing drying system operated in association with the air fractionation system but at independent cycle time period, wherein water-laden nitrogen from the air fractionation system is passed through a desiccant bed of solid water-retaining adsorbent in said drying system while withdrawing dry nitrogen of high purity therefrom, and the adsorbed water is subsequently removed from said desiccant adsorbent by regeneration thereof with heated dry air effluent obtained in rinsing the air fractionating column with desorbed process nitrogen.

7 Claims, 1 Drawing Figure

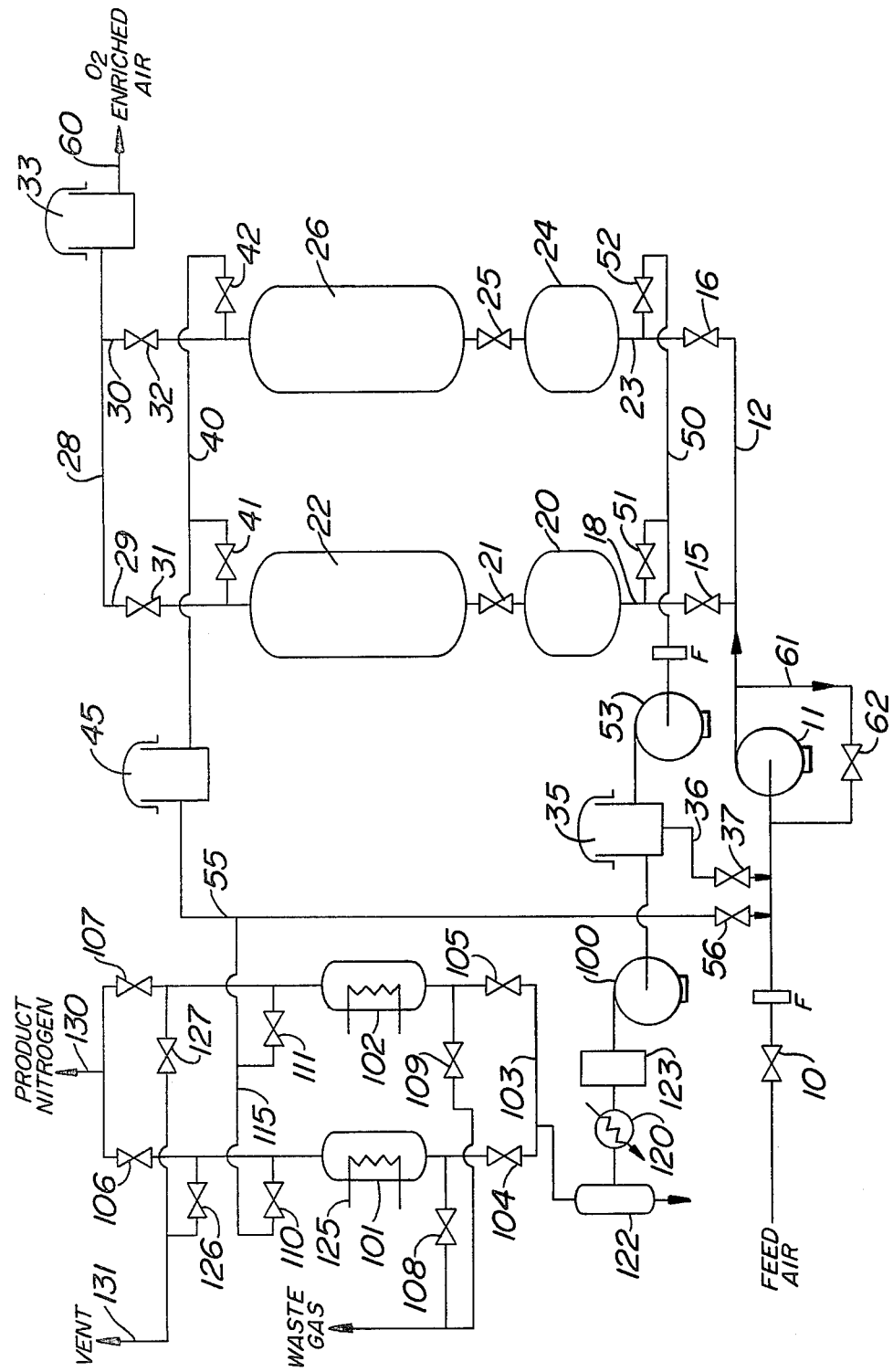

VACUUM SWING ADSORPTION FOR AIR FRACTIONATION

BACKGROUND OF THE INVENTION

1. Field of the Invention

The present invention relates to fractionation of air by selective adsorption and is particularly concerned with a vacuum swing system wherein separate product fractions are recovered including (1) dry oxygen-enriched gas fraction substantially freed of $CO_2$ and (2) a high purity dry nitrogen product.

2. Prior Art

The numerous and diverse systems disclosed in patent literature for fractionation of the main constituents of air by selective adsorption are discussed in prior U.S. Pat. No. 4,013,419. In accordance with the invention described in said U.S. Pat. No. 4,013,429 there is recovered by selective adsorption from an ambient air feed a high yield of nitrogen of high purity as well as a separate product gas enriched in oxygen. The nitrogen product obtained, however, still contains practically all of the original water initially present in the ambient fresh air feed stream introduced into the system. The water content of the recovered nitrogen product, depending upon ambient humidity and prevailing temperatures, may generally be in the order of up to 3.5% volume percent.

In the operation according to the present invention a dry nitrogen product of high purity is obtained in good yield.

In the practice of the present invention the air fractionation follows generally the sequence of steps also employed in prior U.S. Pat. No. 4,013,429. These air fractionation steps comprise:

1. An adsorption step wherein ambient air is passed in series through a pretreatment adsorbent column to remove moisture and carbon dioxide and then through a main column containing adsorbent selective in retention of the nitrogen component, while discharging oxygen enriched product gas.

2. A subsequent rinsing step wherein both the pretreatment column and the main column are washed with nitrogen collected from a previous step in the cycle. The air like exit gas during this step, which is dry and free of $CO_2$, is collected and may be added to the fresh air feed in the next adsorption step.

3. Following the nitrogen rinsing, both the pretreatment column and the main column are evacuated to an intermediate pressure thereby desorbing these columns, and the desorbed nitrogen gas is collected. Part of this nitrogen gas is employed as the rinse gas in a subsequent cycle (step 2).

4. Evacuation of the pretreatment column is continued to lowest pressure in the cycle, while the main column at the intermediate pressure is now brought back to desired adsorption pressure by introduction of part of the oxygen-rich product gas collected from step 1, following which gas flow communication between the main column and the associated pretreatment column is restored, thereby bringing the latter to adsorption pressure.

5. With both the pretreater and main adsorption columns now at desired pressure, the sequence is repeated starting with step 1.

SUMMARY OF THE INVENTION

Further in accordance with the present invention, the wet nitrogen stream obtained by vacuum desorption of the pretreater and main columns during step 3 and during further evacuation of the pretreatment column in step 4, is dried in an operatively associated thermal swing drying section of the system. Such desorbed nitrogen, containing water and $CO_2$, is passed preferably in compressed state, through a desiccant bed containing solid sorbent effective in removing water from the nitrogen feed. The water laden dessicant bed is subsequently thermally regenerated with the passage of dry air obtained as an effluent in rinsing the air separation column (step 2 above) with previously stored desorbed process nitrogen.

BRIEF DESCRIPTION OF THE DRAWING

The single FIGURE of the accompanying drawing is a Schematic flow diagram illustrative of a system adapted for practice of the invention.

DETAILED DESCRIPTION OF THE INVENTION

Ambient feed air is charged through opened value 10, filter F and blower 11 into manifold 12, from which the feed air is alternately introduced into one or the other of two parallel trains of adsorbent columns by opening the appropriate valve 15 or 16. By opening valve 15, the feed gas will pass through branch line 18 into the train including pretreater column 20 and main column 22, when valve 21 therebetween is open. In like manner, when valve 16 is opened, the feed gas in manifold 12 passes through branch line 23 into the train including pretreater column 24 and main column 26 when valve 25 therebetween is open.

Manifold 12 alternatively serves for introduction of nitrogen enriched rinse gas into a selected train 20,22 or 24,26 during a particular period in the cycle when neither of these trains is receiving a feed air charge. Thus, nitrogen enriched rinse gas previously stored in vessel 35, as will hereinafter appear, passes into the inlet of blower 11, through line 36 and opened valve 37, leaving the outlet of the blower via manifold 12, for selective introduction into pretreater 20 when valve 15 is opened or into pretreater 24 when valve 16 is opened. Thus, blower 11 and manifold 12 each serves a dual purpose, on the one hand for introduction of air feed into the selected adsorption train during a fixed interval in the cycle, and during another fixed interval of the cycle for introduction of nitrogen enriched rinse gas into a selected adsorption train.

As will be more fully explained hereafter, the nitrogen enriched rinse gas in vessel 35 is obtained upon desorption of trains 20,22 and 24,26 by the operation of vacuum pump 53 which is connected through manifold 50 and alternately opened valves 51 and 52. This nitrogen enriched gas in vessel 35 may typically comprise about 96% to 99.9% nitrogen with about 500 PPM of oxygen, 500 PPM of carbon dioxide, and up to 3.5% water depending upon ambient air conditions. In addition to being used as rinse gas, this nitrogen enriched gas becomes high purity nitrogen product gas after further treatment as will become apparent hereafter.

At the ends opposite the feed gas inlet of each of the trains 20,22 and 24,26, a gas manifold 28 is provided, connected to each of these trains, respectively, through branch lines 29,30 and valves 31,32. Manifold 28 is connected at its other end to a storage vessel 33 for the oxygen enriched product gas as will be further described.

Branch lines 29,30 also connect to a second gas discharge manifold 40 through valves 41,42, respectively. Thus, with valve 41 being opened and valve 31 closed, voids gas discharged from column 22 passes into manifold 40. In like manner, when valve 42 is opened and valve 32 closed, voids gas discharged from column 26 passes into manifold 40. The voids gas received in manifold 40 is discharged into storage vessel 45, and a line 55 is provided for recycling some of this gas from vessel 45 to the inlet of blower 11 under control of valve 56.

The operation of the system thus far described is largely similar to that disclosed in U.S. Pat. No. 4,013,429. A noted difference in the present invention is in the use of the same blower 11 at alternate intervals, (1) for introduction into the adsorption columns of the air feed to be fractionated and (2) for introduction into these columns of nitrogen rinse gas from vessel 35.

In operation of the system thus far described, a feed stream composed of fresh ambient air and recycle voids gas from storage vessel 45 is admitted to blower 11 through open valves 10 and 56, respectively. Blower 11 discharges into manifold 12 which, in turn, alternately introduces the charge gas into one or the other of the trains of adsorption columns. Assuming that the train comprising columns 20 and 22 is then on stream, valves 15, 21 and 31 will then be open. The feed gas will be passed through pretreater column 20 and main adsorber column 22, the effluent being discharged through line 29. Pretreater columns 20 and 24 each contains adsorbent effective in selective removal of water and carbon dioxide from the gas stream passed therethrough. Main columns 22 and 26 contain adsorbent selective in retention of nitrogen. Accordingly, a dried oxygen enriched effluent gas is discharged from column 22 during the adsorption step, into storage vessel 33 via manifold 28. Part of this stored gas is withdrawn from vessel 33, via line 60, as the oxygen enriched product gas having an oxygen purity in the order of 90%.

Charging of air into the adsorption train 20-22 is continued until the composition of the effluent gas in manifold 28 reaches a pre-set level. At this point, valves 10, 56 and 31 are closed and valves 37 and 41 are opened. Then a stream of nitrogen rinse gas from vessel 35 is introduced into the adsorption train 20-22 by blower 11 and manifold 12 via open valve 15 and branch line 18. The effluent from the train during this step, comprising void and displaced gases from column 22, is withdrawn through valve 41 and manifold 40. The withdrawn voids gas, which is stored in vessel 45, is essentially dry and free of CO₂, and has a composition similar to that of air. Typically the dry voids gas is comprised of 20 to 23% oxygen and about one percent argon, the balance being nitrogen.

Flow of nitrogen into the adsorption train is continued until the entire train is saturated with the high nitrogen rinse gas. At this point, valves 37,15 and 41 are closed and valve 51 opened. Since no gas is now being admitted to the inlet of blower 11, a closed-path recirculation by-pass is provided around the blower through line 61 from the outlet to the inlet thereof, valve 62 being then open.

The train 20-22 is now evacuated to a sub-atmospheric pressure level by vacuum pump 53 through manifold 50. The evacuated gas, which is the nitrogen enriched gas, is stored in vessel 35. After the desired preset vacuum level is attained in columns 20 and 22, valve 21 is closed and evacuation of pretreatment column 20 alone is continued through manifold 50 to a still lower vacuum level. The evacuated nitrogen enriched gas during this step is also stored in vessel 35.

While column 20 is undergoing the additional evacuation step, valve 31 is opened and a stream of oxygen-enriched gas from vessel 33 is introduced into column 22 through manifold 28 and line 29, whereby the pressure in that column is raised to a near ambient pressure level. Thereafter, valve 51 is closed and valve 21 is reopened to introduce oxygen enriched gas from vessel 33 into column 20 through manifold 28, line 29 and column 22, thereby also raising the pressure in the pretreater column to near ambient level. At this point, valves 10, 56 and 15 are reopened and a fresh cycle is started by reintroducing feed gas into the train.

The second train, comprised of columns 24 and 26, undergoes an identical operational sequence as that described above for the train 20-22, but there is a phase difference between their executions. This will be clear from the following description of the cycle times.

The timing format in which each step of the designed process is executed is a very important parameter because it determines the sizes of the adsorber vessels and the storage tanks. Shorter cycle times are preferred for more frequent utilization of the adsorbers. This reduces the adsorbent inventory and the size of the storage tanks.

Table 1 describes the cycle time format for a two-minute complete cycle. It is designed to meet the following two criteria:

(a) Continuous operation of the vacuum pump
(b) Use of a single blower for flowing the feed air and the nitrogen rinse gas into the train.

The first criteria is satisfied by making the duration of the regeneration step equal to the combined durations of the adsorption, nitrogen rinse and the pressurization steps. The second criterion is met by adjusting the relative durations of the adsorption and the nitrogen rinse steps so that the same gas flow rate is used for these steps. The overall durations of each step are listed in Table 2.

TABLE 1

COLUMN PERFORMANCE FOR TWO-MINUTE COMPLETE CYCLE

| Time (seconds) | Column 20 | Column 22 | Column 24 | Column 25 |
|---|---|---|---|---|
| 0    7.5    | P  | P  | R  | R  |
| 7.5–43.0    | A  | A  | R  | R  |
| 43.0  45.0  | NR | NR | R  | R  |
| 45.0  60.0  | NR | NR | R  | P  |
| 60.0  67.5  | R  | R  | P  | P  |
| 67.5  103.0 | R  | R  | A  | A  |
| 103.0 105.0 | R  | R  | NR | NR |
| 105.0 120.0 | R  | P  | NR | NR |

P = Pressurization
A = Adsorption
NR = Nitrogen Rinse
R = Regeneration

TABLE 2

OVERALL DURATIONS OF THE STEPS FOR TWO-MINUTE COMPLETE CYCLE

| Steps | Main Columns | Pretreatment Columns |
|---|---|---|
| Adsorption | 35.5 seconds | 35.5 seconds |
| Nitrogen Rinse | 17.0 seconds | 17.0 seconds |
| Regeneration | 45.0 seconds | 60 seconds |

TABLE 2-continued
OVERALL DURATIONS OF THE STEPS FOR TWO-MINUTE COMPLETE CYCLE

| Steps | Main Columns | Pretreatment Columns |
|---|---|---|
| Pressurization | 22.5 seconds | 7.5 seconds |
| | 120.0 seconds | 120.0 seconds |

TABLE 3
COLUMN PERFORMANCE FOR FOUR-MINUTE COMPLETE CYCLE

| Time (seconds) | Column 20 | Column 22 | Column 24 | Column 26 |
|---|---|---|---|---|
| 0–15 | P | P | R | R |
| 15–86 | A | A | R | R |
| 86–90 | NR | NR | R | R |
| 90–120 | NR | NR | R | P |
| 120–135 | R | R | P | P |
| 135–206 | R | R | A | A |
| 206–210 | R | R | NR | NR |
| 210–240 | R | P | NR | NR |

P = Pressurization
A = Adsorption
NR = Nitrogen Rinse
R = Regeneration

TABLE 4
OVERALL DURATIONS OF THE STEPS FOR FOUR-MINUTE COMPLETE CYCLE

| Steps | Main Columns | Pretreatment Columns |
|---|---|---|
| Adsorption | 71.0 seconds | 71.0 seconds |
| Nitrogen Rinse | 34.0 seconds | 34.0 seconds |
| Regeneration | 90.0 seconds | 120.0 seconds |
| Pressurization | 45.0 seconds | 15.0 seconds |
| | 240.0 seconds | 240.0 seconds |

Tables 3 and 4 describe the corresponding formats for a four minute complete cycle. The choice of time length for a complete cycle will largely depend upon the relative size of the bed of adsorbent employed in the main adsorbent columns (22,26) for a given volume throughput of fresh air feed and the nitrogen adsorbent capacity of the particular adsorbent employed. The pretreatment beds are sized so that during the on-stream air blow, these beds have an adsorbent capacity sufficient to pick up and hold the moisture and $CO_2$ content of the influent air feed stream so that these do not enter the main adsorption columns (22,26). While cycle times of two and four minutes, respectively, have been described in the illustrated embodiments, based on practical systems employing two parallel trains of adsorbers, it will be understood that other time cycles may be employed in practice of the invention. Also, in some instances, it may be found desirable to employ a time schedule based on three or more parallel trains of adsorbers in appropriate time sequence. The valve changes during the cycle of operations in such modifications are programmed in well-known manner and are carried out automatically under control of a cycle timer device.

The operation of the valves corresponding to the illustrated embodiments of two and four minute cycle time formats, respectively, are given in Table 5. It may be seen from Table 5 that valves 10, 37, 56, 62 open twice in a complete cycle, while each of the other valves open once in the entire cycle. Valve 62, when open, allows the blower 11 to idle for a short period of time (6.25% of the whole cycle) in every cycle.

TABLE 5
VALVE POSITIONS FOR TWO AND FOUR MINUTE COMPLETE CYCLES

| Two-Minute Cycle Time (seconds) | VALVE | | | | | | | | | | | | | | Four-Minute Cycle Time (seconds) |
|---|---|---|---|---|---|---|---|---|---|---|---|---|---|---|---|
| | 10 | 56 | 37 | 62 | 15 | 51 | 21 | 31 | 41 | 16 | 52 | 25 | 32 | 42 | |
| 0–7.5 | C | C | C | O | C | O | O | O | C | C | O | O | C | C | 0–15.0 |
| 7.5–43.0 | O | O | C | C | O | C | O | O | C | C | O | O | C | C | 15.0–86.0 |
| 43.0–45.0 | C | C | O | C | O | C | O | C | O | C | O | O | C | C | 86.0–90.0 |
| 45.0–60.0 | C | C | O | C | O | C | O | C | O | C | O | C | O | C | 90.0–120.0 |
| 60.0–67.5 | C | C | C | O | C | O | O | C | C | C | C | O | O | C | 120.0–135.0 |
| 67.5–103.0 | O | O | C | C | C | O | O | C | C | O | C | O | O | C | 135.0–206.0 |
| 103.0–105.0 | C | C | O | C | C | O | O | C | C | O | C | O | C | O | 206.0–210.0 |
| 105.0–120.0 | C | C | O | C | C | O | C | O | C | O | C | O | C | O | 210.0–240.0 |

O = Open
C = Close

In principle, any adsorbent which selectively adsorbs nitrogen over oxygen can be used in the main columns. However, based on our laboratory screening, "Zeolon-900 Na", a synthetic sodium mordenite, is preferred from among other Zeolitic commercial adsorbents. Others that may be used, include the commercially available 5A and 13X zeolites, which are known to be selective towards nitrogen.

In the pretreatment columns, any sorbent that is selective towards $H_2O$ and $CO_2$ can be used. However, sorbents which exhibit short mass transfer zones for these adsorbates will be preferred. Based on laboratory tests, 13X molecular sieve is presently preferred as the sorbent for the pretreatment colum. Other adsorbents that may be employed in the pretreater columns include silica gel, alumina, or molecular sieve types such as 5A'. A combination of two or more types of adsorbents may also be employed.

In the system of U.S. Pat. No. 4,013,429, as well as in the present system as thus far described, the nitrogen enriched gas obtained during vacuum desorption of the columns and accumulated in vessel 35 contains all of the water and $CO_2$ initially present in the ambient air charged to the system. A unique arrangement has therefore been devised, in accordance with the present invention, which enables the recovery of the desorbed nitrogen as a dry product gas of higher purity.

The desired dry nitrogen product is obtained by use of a companion nitrogen drying section operated in parallel with the air fractionation section of the system. The principal components of the drying section are comprised of compressor or blower 100 and desiccant columns 101–102, each of which columns alternately undergoes an adsorption step and a regeneration step as will hereinafter appear.

Dessicant columns 101–102 are alternately and in timed sequence supplied with nitrogen gas from a common manifold 103, by opening the associated one of the connecting valves 104–105. Wet nitrogen gas is withdrawn from storage vessel 35 by the compressor or blower 100. If the ultimate pure product nitrogen is desired at super-atmospheric pressure, the wet nitrogen gas from storage vessel 35 is initially compressed to desired extent, as to five to ten atmospheres, by a compressor at 100. Such compression permits ready removal of a portion of the water contained therein, before introducing the gas into either of the desiccant columns 101–102. Thus, in the embodiment illustrated in the flow diagram, the wet gas discharged from compressor 100, is after-cooled in a conventional water-cooled condensor 120 and the condensed water portion is removed therefrom in a liquid trap or liquid-vapor separator 122. Trace amounts of oxygen possibly present in the nitrogen gas withdrawn from vessel 35, may be removed, if so desired, by conventional methods known in the art for deoxygenation of gases. For example, the gas discharged from 100 may be treated with hydrogen in a catalytic reactor, preferably located in advance of condensor 120, as indicated at 123, so that the small amount of water thereby formed, is conveniently removed in separator 122 as part of the liquid condensate. For most uses of recovered dry nitrogen, the deoxygenation step may be omitted.

If the product dry nitrogen is not required at superatmospheric pressure, a simple blower may be employed instead of the compressor at 100. The blower need only discharge the gas at slightly above ambient pressure sufficient to overcome the pressure drop through the desiccant columns and associated valves and lines, and the gas thus be introduced directly into manifold 103. In any event, the gas from manifold 103 is introduced into and passed through the selected dessicant column 101,102, by opening the associated connecting valve 104 or 105.

Assuming that desiccant column 101 is the one that has been freshly regenerated, valve 104 is opened, keeping discharge valve 106 closed, thus permitting nitrogen feed gas from vessel 35 to be introduced into the column. When the pressure inside that column rises to the desired nitrogen feed gas pressure level, valve 106 is opened and a stream of dry product gas is withdrawn through the exit end of the column. This is continued until column 101 is about saturated with water and water is about to break through column 101, at which time valves 104 and 106 are closed and the nitrogen feed is switched to column 102 by opening valve 105.

Column 101 is now ready for regeneration. This is effected by first opening valve 108 at the feed gas inlet end of that column, permitting gas to be discharged therefrom to waste until the pressure in the column is lowered to near ambient pressure level. A similar valve 109 is provided at the inlet end of column 102, for depressuring that column during its turn at regeneration.

With column 101 now at near ambient pressure a purge stream of dry voids gas from storage vessel 45 is passed through line 115 and is used for purging that column. As illustrated, the purge stream is internally heated by a heating coil 125 within the column which coil is activated at the appropriate time. Optionally, heating of the purge gas can be effected by installation of a heater in line 115 through which the purge gas from vessel 45 is alternately introduced into columns 101 and 102. In either event, the purge gas is admitted to column 101 by opening valve 110, permitting the hot purge gas to flow through that column in a direction opposite to that of gas flow during the water adsorption step, and is continued until the column is completely reactivated. The effluent gas during the hot gas purge is permitted to go to waste through open valve 108. When regeneration of column 101 is thus completed, valves 108 and 110 are closed and a fresh adsorption step is started by opening valve 104. If an internal heater is employed in column 101, it would be switched off at this time. Regeneration of column 102 is started at the same time following the identical format as that of column 101.

According to the present invention, the use of voids gas as the regenerating purge gas for the desiccant columns eliminates the use of a part of the dried and compressed nitrogen product as the regenerating purge gas. Consequently, the recovery of nitrogen can be increased by as much as 15% while the energy of compression is decreased. However, by using a stream of gas having essentially the composition of air as the purge gas, a small quality of oxygen will remain in the desiccant column at the end of the purge step. As a result, there is a slight increase in the oxygen concentration of the dry nitrogen product stream during the initial period of product withdrawal from the desiccant column. This problem is readily resolved by venting the effluent from the desiccant column for a very short period of time at the initial part of the adsorption step, thereby purging out the diluent oxygen from the column. Such venting is accomplished by opening valve 126 for a few minutes, when column 101 is first put on stream for water adsorption while valve 106 is closed. In the same manner venting of column 102 is effected through opened valve 127, with valve 107 closed.

The initial venting of the effluent from the desiccant column, besides removing oxygen, is desirable in another respect. It permits reintroduction of fresh feed gas containing dilute water impurities into the hot regenerated column without resorting to the usual and time consuming procedure of precooling the columns. Such operation, however, results in a small spike of water impurity in the effluent gas at the very initial part of the cycle. By thus venting the initial part of the effluent, such as up to 1% of the dried porduct, the slight water contamination that would otherwise be in the ultimate dry nitrogen product is avoided. The benefits achieved by the described procedure include:

(a) elimination of the cooling step, consequently avoiding the requirement for a third desiccant column commonly employed when cooling of the desiccant column needs to be practiced;

(b) high recovery of pure nitrogen product, and (c) preservation of the product nitrogen compression energy.

A practical cycle time format suitable for the above mentioned thermal swing adsorption cycle (TSA) is set out in Table 6, employing a period of 16 hours for a complete cycle, in which about half the period is devoted to drying the gas and the other half to regeneration of the adsorbent. Table 7 describes the valve positions conforming to the cycle described in Table 6.

TABLE 6

COLUMN PERFORMANCE FOR THE TSA SECTION FOR 16 HOURS COMPLETE CYCLE

| Time (Hours) | Column 101 | Column 102 |
| --- | --- | --- |
| 0.0 –0.05 | Adsorption with dry product withdrawal | Pressure reduction to ambient |
| 0.05–7.94 | Adsorption with dry product withdrawal | Regeneration |
| 7.94–7.95 | Adsorption with dry | Pressurization to |

TABLE 6-continued

COLUMN PERFORMANCE FOR THE TSA SECTION
FOR 16 HOURS COMPLETE CYCLE

| Time (Hours) | Column 101 | Column 102 |
|---|---|---|
| 7.95–8.00 | product withdrawal Adsorption with dry product withdrawal | feed pressure level Adsorption with initial venting of effluent |
| 8.00–8.05 | Pressure reduction to ambient | Adsorption with dry product withdrawal |
| 8.05–15.94 | Regeneration | Adsorption with dry product withdrawal |
| 15.94–15.95 | Pressurization to feed pressure level | Adsorption with dry product withdrawal |
| 15.95–16.00 | Adsorption with initial venting of effluent | Adsorption with dry product withdrawal |

TABLE 7

VALVE POSITIONS FOR THE TSA SECTION
16 HOURS TOTAL CYCLE

| Time (hours) | 104 | 126 | 108 | 110 | 106 | 127 | 105 | 109 | 111 | 107 |
|---|---|---|---|---|---|---|---|---|---|---|
| 0.0–0.05 | O | C | C | C | O | C | C | O | C | C |
| 0.05–7.94 | O | C | C | C | O | C | C | O | O | C |
| 7.94–7.95 | O | C | C | C | O | C | O | C | C | C |
| 7.95–8.00 | O | C | C | C | O | O | O | C | C | C |
| 8.00–8.05 | C | C | O | C | C | C | O | C | C | O |
| 8.05–15.94 | C | C | O | O | C | C | O | C | C | O |
| 15.94–15.95 | O | C | C | C | C | C | O | C | C | O |
| 15.95–16.00 | O | O | C | C | C | C | O | C | C | O |

O = Open
C = Close

Any adsorbent that is selective towards water retention can be used in the desiccant columns. As in the case of the pretreater columns 20 and 24, here also an adsorbent that has short mass transfer zone characteristics is preferred. The recommended adsorbent is 13X molecular sieve, although other desiccants like alumina and silica gel can also be used.

Adsorbents such as 13X molecular sieve will also initially remove $CO_2$ as well as water from a nitrogen stream containing the same. However, during the long cycle time herein advocated there will be an eventual breakthrough of the $CO_2$ while the capacity of the adsorbent for the retention of water is still retained; unless, of course, the adsorbent bed is sufficiently sized to retain $CO_2$. The presence of the small quantity of $CO_2$ in the recovered dry nitrogen product is usually not undesirable in an otherwise pure nitrogen product which is to be used as an inert gas. If desired, however, the $CO_2$ can be readily kept out of the recovered nitrogen product by designing columns 101 and 102 of larger size, or by other means.

In a typical operation in practice of the invention, the fresh ambient feed air and recycled air from line 55 is raised in blower 11 to only slightly above atmospheric pressure to accomodate the pressure drop through these columns and associated flow lines and valves, such as to about 16–17 psia (about 1.12 to 1.20 kg/sq. cm.). The adsorption step is continued until incipient breakthrough of air from the nitrogen adsorption column occurs or somewhat short of it, depending upon the desired concentration of the oxygen-enriched product. In the vacuum desorption of the main columns 22 and 26, these are brought to an intermediate pressure in the range of 30 to 100 Torr such as, for example, 65 Torr. The final vacuum desorption of pretreatment beds 20 and 24 is carried to a still lower level, preferably in the range of 10 to 50 Torr. For example, 15 Torr is a typical vacuum pressure when 13X sieve is used.

In the nitrogen drying section, the collected nitrogen rich gas withdrawn from storage in vessel 35 is compressed to the desired product pressure as previously described and is then cooled down to about ambient temperature for introduction into the on-stream desiccant bed (101 or 102). For regeneration of the desiccant beds, the regeneration gas is heated to about 400°–500° F. (about 200°–260° C.). The dry nitrogen product gas is then withdrawn from line 130 with a nitrogen purity of 99.9% or higher.

In the embodiment illustrated in the accompanying drawing two main adsorbent columns are shown operated in parallel in scheduled sequence. In the described schedule there is a short period during which neither main bed is receiving ambient air feed nor rinse gas. During such period, blower 11 is maintained in operation by recirculation of gas via line 61 and valve 62. If desired, however, uninterrupted operation can be achieved by increasing the number of parallel trains of air fractionation columns and adjusting the cycle programming accordingly.

What is claimed is:

1. In a method for fractionation of ambient air containing water vapor and carbon dioxide by pressure swing adsorption with the simultaneous recovery of a dry oxygen-enriched product stream and a high purity nitrogen stream, wherein ambient air is initially subjected to pretreatment with a first adsorbent bed for selective adsorption of water vapor and carbon dioxide therefrom and the unadsorbed effluent from such pretreatment is subjected to contact with a second adsorbent bed selective in retention of nitrogen as opposed to oxygen while collecting the oxygen enriched effluent gas, and then followed in sequence by the steps of (1) rinsing the nitrogen-selective adsorbent bed and pretreatment adsorbent bed with high purity nitrogen passed co-currently through both said adsorbent beds while collecting the voids gas effluent, and (2) countercurrent desorption of nitrogen from said second adsorbent bed by pressure reduction and flowing said desorbed nitrogen at the reduced pressure through said first adsorbent bed, thereby inducing desorption of water and carbon dioxide therefrom while collecting the nitrogen rich gas effluent discharged from the first adsorbent bed, which effluent contains water and $CO_2$ of the feed air; the improved method for recovering the resulting nitrogen as dry gas of high purity, which comprises:

(a) passing the water and $CO_2$-laden nitrogen rich gas effluent through a first of a second pair of desiccant beds containing solid adsorbent capable of retaining water and collecting the dried nitrogen effluent as product gas during a fixed time period short of water breakthrough from said desiccant bed;

(b) during said fixed time period regenerating the companion desiccant bed, which is water laden, by passing through the said bed a stream of said voids gas at near ambient pressure and at elevated temperature;

(c) and at the end of said fixed period switching the flow of the nitrogen rich effluent to the freshly regenerated companion bed while initiating regeneration of said first desiccant bed by the procedure defined in step (b).

2. The method as defined in claim 1 wherein only part of the voids gas effluent collected from step (1) above is employed in regenerating the desiccant bed, the remainder being recycled for addition to the ambient air feed to be fractionated.

3. The method as defined in claim 1 wherein the water and $CO_2$-laden nitrogen rich stream is compressed and the nitrogen stream is then cooled and the condensed water is removed therefrom prior to introduction of said stream into said desiccant bed.

4. The method as defined in claim 3 wherein any trace amounts of oxygen present in the water and $CO_2$-laden nitrogen rich effluent is removed from the compressed stream prior to introduction of said stream into the desiccant bed.

5. The method as defined in claim 1 wherein said fixed time period and the capacity of the desiccant bed is such that $CO_2$ is removed from the dry nitrogen effluent discharged as product from said desiccant bed.

6. The method as defined in claim 1 wherein during a minor short portion of the initial period of passing of the nitrogen rich gas through a desiccant bed, the discharge from such desiccant bed is vented.

7. In an air fractionation process wherein atmospheric air during an on-stream period is passed in sequence through a pretreating column containing adsorbent effect in removal of water and $CO_2$ from the air and the unadsorbed effective in removal of water and $CO_2$ from the air and the unadsorbed effluent from said pretreating column is then passed through a second column containing an adsorbent selective in retention of nitrogen, while discharging and collecting during said on-stream period an unadsorbed primary effluent as an oxygen-enriched product gas; and wherein in a second step following said on-stream period, said pretreating column and said second column are rinsed with high purity nitrogen passed therethrough in the same direction as the previous air feed, while collecting the voids gas effluent discharged through said second column, and wherein following said rinsing and while retaining gas flow communication between said pretreating column and said second column, pressure is reduced at the air inlet end of said pretreating column, thereby causing desorption of retained nitrogen from the adsorbent in said second column and flow of the desorbed nitrogen into and through said pretreating column and thereby inducing desorption of water and $CO_2$ from said pretreating column; and wherein the nitrogen rich effluent containing the water and $CO_2$ is discharged from said pretreating column is collected and a portion thereof employed to rinse said columns in the aforesaid second step;

the improvement which comprises:

passing a compressed portion of the obtained nitrogen rich effluent through a desiccant bed of solid sorbent effective in retention of water and during a time period short of water breakthrough from said bed, while discharging from said desiccant bed a stream of dry high purity nitrogen, and regenerating said desiccant bed with a stream of hot dry gas obtained by heating the dry voids gas collected as the rinse gas effluent in said second step.

* * * * *

UNITED STATES PATENT AND TRADEMARK OFFICE
CERTIFICATE OF CORRECTION

PATENT NO. : 4,264,340
DATED : 28 April 1981
INVENTOR(S) : Shivaji Sircar, Thomas R. White It is certified that error appears in the above-identified patent and that said Letters Patent are hereby corrected as shown below:

Column 6, Table 5, Line 20, Valve 51
Delete "O" and substitute therefor --C--

Signed and Sealed this

Twentieth Day of July 1982

[SEAL]

Attest:

GERALD J. MOSSINGHOFF

Attesting Officer

Commissioner of Patents and Trademarks